United States Patent [19]

Nishikawa et al.

[11] 3,813,682
[45] May 28, 1974

[54] PHOTOMECHANICAL CAMERA

[75] Inventors: Yukio Nishikawa; Yoshio Nagao, both of Kyoto; Yoshio Miyauchi, Shiga; Noriaki Mori, Shiga; Shigenori Matsui, Shiga, all of Japan

[73] Assignee: Dainippon Screen Seizo Kabushiki-Kaisha, Kyoto, Japan

[22] Filed: Nov. 20, 1972

[21] Appl. No.: 308,267

[52] U.S. Cl.................... 95/31 R, 355/16, 352/183
[51] Int. Cl. ........................................... G03b 19/04
[58] Field of Search........ 95/31; 355/3, 16; 352/183

[56] References Cited
UNITED STATES PATENTS

| | | | |
|---|---|---|---|
| 1,927,062 | 9/1933 | Conn | 352/183 |
| 2,462,439 | 2/1949 | Thompson | 355/16 |
| 3,282,177 | 11/1966 | Stanton | 355/3 |
| 3,392,235 | 7/1968 | Burzan | 352/183 |
| 3,443,867 | 5/1969 | Scheffel | 355/29 |

Primary Examiner—John M. Horan
Attorney, Agent, or Firm—Spensley, Horn and Lubitz

[57] ABSTRACT

A photomechanical camera for use with a roll film has a vacuum suction box disposed in a camera housing and having a perforated front wall facing the lens system of the camera. An endless conveyor belt of a perforated material extends around the suction box and has a front run extending in substantially parallel and close contact relationship with the suction box front wall so that air is sucked into the suction box through the perforations in the belt and the suction box front wall. A length of film severed off and fed from the roll film onto the front run of the conveyor belt is sucked against the belt in the front run thereof and is conveyed toward an exposure position in which the center of the length of film in alignment with the optical axis of the lens system. Drive of the belt is so controlled that the motion of the belt is interrupted when the length of film is reached by the exposure position whereby the film is retained by the vacuum force in the exposure position during the exposure thereof.

10 Claims, 4 Drawing Figures

PHOTOMECHANICAL CAMERA

BACKGROUND OF THE INVENTION

1. Field of the Invention

The present invention relates generally to a camera, and, more particularly, to a photomechanical camera of a type that uses a roll film.

2. Description of Prior Art

Many of the heretofore known photomechanical cameras have been of a type that utilizes sheet film as a light sensitive material. For the simplification purpose of camera work, there have recently been deviced photomechanical cameras of a type that is usable with roll film and has means for the automatic or remote control of the severing of lengths of film from the roll film and the conveyance of the severed lengths of film to and from an exposure position in the camera.

In general, the photomechanical camera of the lastly mentioned type utilizes a vacuumed suction board which is operable by vacuum force to hold and retain thereof a length of film fed onto the suction board from a roll film magazine disposed above the suction board within the camera. When the length of film fed onto the suction board amounts to a desired dimension, the length of film is severed off the roll film. Various lengths of film fed onto the suction board have their centers offset from the optical axis of the lens system of the camera. Thus, various lengths of film are required to be adjusted so as to bring their centers into alignment with the optical axis. For this purpose, the prior art photomechanical camera has its film suction board which is vertically movable so as to accomodate various lengths of film.

The prior art photomechanical camera, therefore, falls short of satisfaction in that complicated arrangement and construction are required for allowing the film suction board to be vertically movable and that the movable suction board is tended to provide an inaccurate focal distance.

SUMMARY OF THE INVENTION

It is an object of the present invention to provide an improved photomechanical camera for use with a roll film.

It is another object of the present invention to provide a photomechanical camera of the class specified and in which various lengths of film severed off the roll film can be conveyed to and from an exposure position in the camera by conveyor means of a simple structure and reliable operation.

It is a further object of the present invention to provide a photomechanical camera of the class specified and in which the centers of various lengths of film can be automatically brought into alignment with the optical axis of the camera.

It is a further object of the present invention to provide a photomechanical camera of the class specified and in which lengths of film severed off the roll film are held on the conveyor means during conveyance and are positively retained in the exposure position with the light sensitive surfaces being in focus during exposure of the lengths of film.

The photomechanical camera according to the present invention is designed for use with a roll film and comprises a camera housing, means in the housing for drawing a part of the film from the roll film and feeding the drawn film part toward an exposure position in which the center of the fed film part is aligned with the optical axis of the camera, a conveyor means including a belt member of a perforated material so arranged in the camera housing as to have a run substantially perpendicular to the optical axis, the said run including the exposure position therein, means for driving the belt member to cause the same to be moved in the run in a direction extending from the drawing and feeding means to and past the exposure position, means for sucking air inwardly of the loop of the conveyor belt member through the perforations in the conveyor belt member, the sucking means being operative to exert vacuum force to the film part through the perforations in the conveyor belt member in the run for sucking the film part against the conveyor belt member in the run while the conveyor belt member is driven in the mentioned direction whereby the film part is conveyed by the conveyor belt member from the drawing and feeding means toward the exposure position, and means for controlling the operation of the driving means so that the conveyor belt member is stopped just at a time when the film part is moved to the exposure position whereby the film part is retained in the exposure position by the vacuum force during the exposure of the film part.

The sucking means preferably includes a vacuumed suction box disposed within the loop of the conveyor belt member and having a substantially flat perforated wall portion extending in substantially parallel and close contacting relationship with the run of the belt member. The suction box is preferably pneumatically connected to a vacuum pump by means of a conduit in which a pressure regulation valve may advantageously be provided.

The film feeding means preferably comprise a pair of rolls one of which is preferably driven by the driving means which preferably is also operative to drive the conveyor belt member. The driving means preferably includes an electric motor and a transmission mechanism.

In a preferred embodiment of the invention, the controlling means may advantageously include cams provided on a member which is preferably driven by the drive means. The cams may preferably be associated with a microswitch so that the latter is actuated by the cams as the mentioned member is rotated by the motor. The microswitch may preferably be electrically connected to a relay circuit which may preferably be electrically connected to the vacuum pump and the motor for the control thereof.

The transmission mechanism may advantageously include a clutch means which preferably is in the form of an electromagnetic clutch electrically connected to the relay circuit so that the engagement and disengagement of the clutch is electrically controlled so as to control the transmission of torque of the motor to the film feeding roll.

The above and other objects, features and advantages of the invention will be made apparent by the following description with reference to the accompanying drawings.

DESCRIPTION OF A PREFERRED EMBODIMENT

Figure 1:
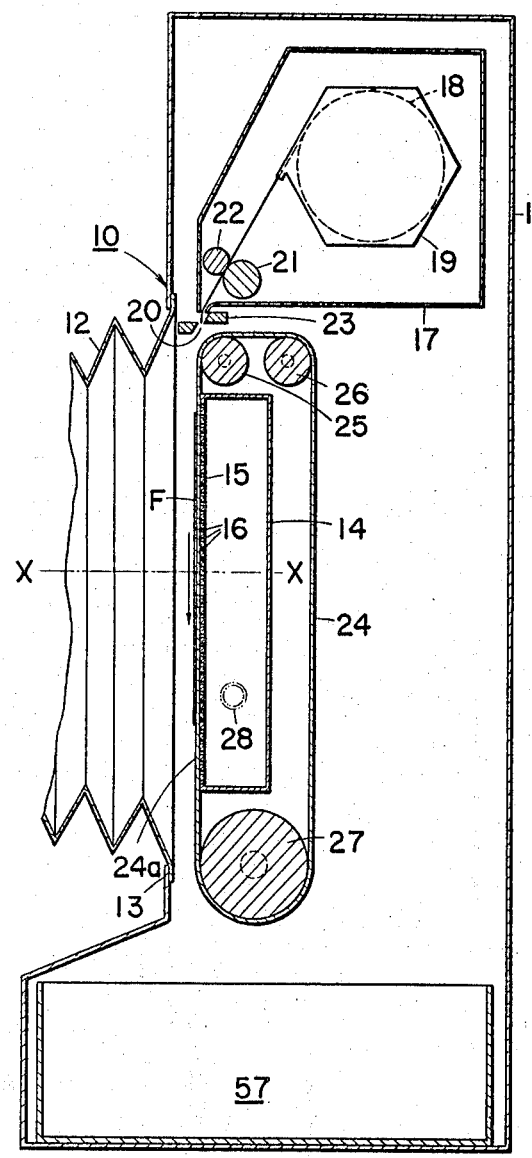
FIG. 1 is a schematic vertical sectional view of the camera housing of an embodiment of the photomechanical camera according to the present invention.

Referring to FIG. 1, there is shown a photomechanical camera, generally indicated at 10, according to an embodiment of the present invention. The camera includes a substantially rectangular housing 11 and a bellows 12 connected at one end to the peripheral edge of an opening 13 formed in the substantially central area of the front wall of the housing 11. The bellows 12 is connected at the other end to a lens support (not shown) in known manner.

Disposed within the housing 11 is a film suction box 14 in opposite relationship with the opening 13. The suction box 14 is stationary relative to the housing 11 and has a front wall 15 in which apertures or perforations 16 are formed for the purpose to be described later.

In the section of the housing 11 above the suction box 14 is disposed a film magazine 17 having a generally square cross-section. The magazine 17 is adapted to receive a roll film 18 preferably housed in a cassette 19. Successive portions of film are adapted to be fed from the cassette 19 to a position for the exposure thereof. For this purpose, the magazine 17 has a film outlet 20 formed preferably at a corner of the magazine. A film feed roll 21 is disposed within the magazine 17 adjacent the film outlet 20. The roll 21 is operatively connected with a drive mechanism to be described later so that the roll 21 cooperates with a pressure roll 22 to draw a length of film out of the cassette 19 and advance the length of film through the outlet 20 in the magazine 17. It is to be understood that the cassette 19 is not an essential element for the invention because the cassette may be omitted if the magazine 17 and the housing 11 are of substantially light-tight structure.

Adjacent the film outlet 20 and outside the film magazine 17 is provided a cutter means 23 comprising a pair of knife edges cooperative together to sever a length of film F from the film roll 18 so that the severed length of film F is advanced or fed to the exposure position by a conveyor means presently described.

The conveyor means includes an endless belt 24 of a perforated ribbon-like material which forms a loop extending around a pair of guide rollers 25 and 26 and a belt drive roller 27. The guide rollers 25 and 26 are disposed between the suction box 14 and the film magazine 17 while the drive roller 27 is disposed below the suction box 14. The guide and drive rollers 25, 26 and 27 are arranged such that the endless belt 24 is driven in a direction indicated by an arrow in FIG. 1 and has a front run 24a extending substantially in parallel and close contact relationship with the perforated front wall 15 of the suction box 14. The endless belt 24 has a large number of perforations which advantageously are so arranged that at least one of the perforations in the area of the endless belt 24 covered by the severed length of film F and, preferably, as many perforations in that area as possible, are always registered with at least one of the perforations 16 in the front wall 15 of the suction box 14.

Figure 2:
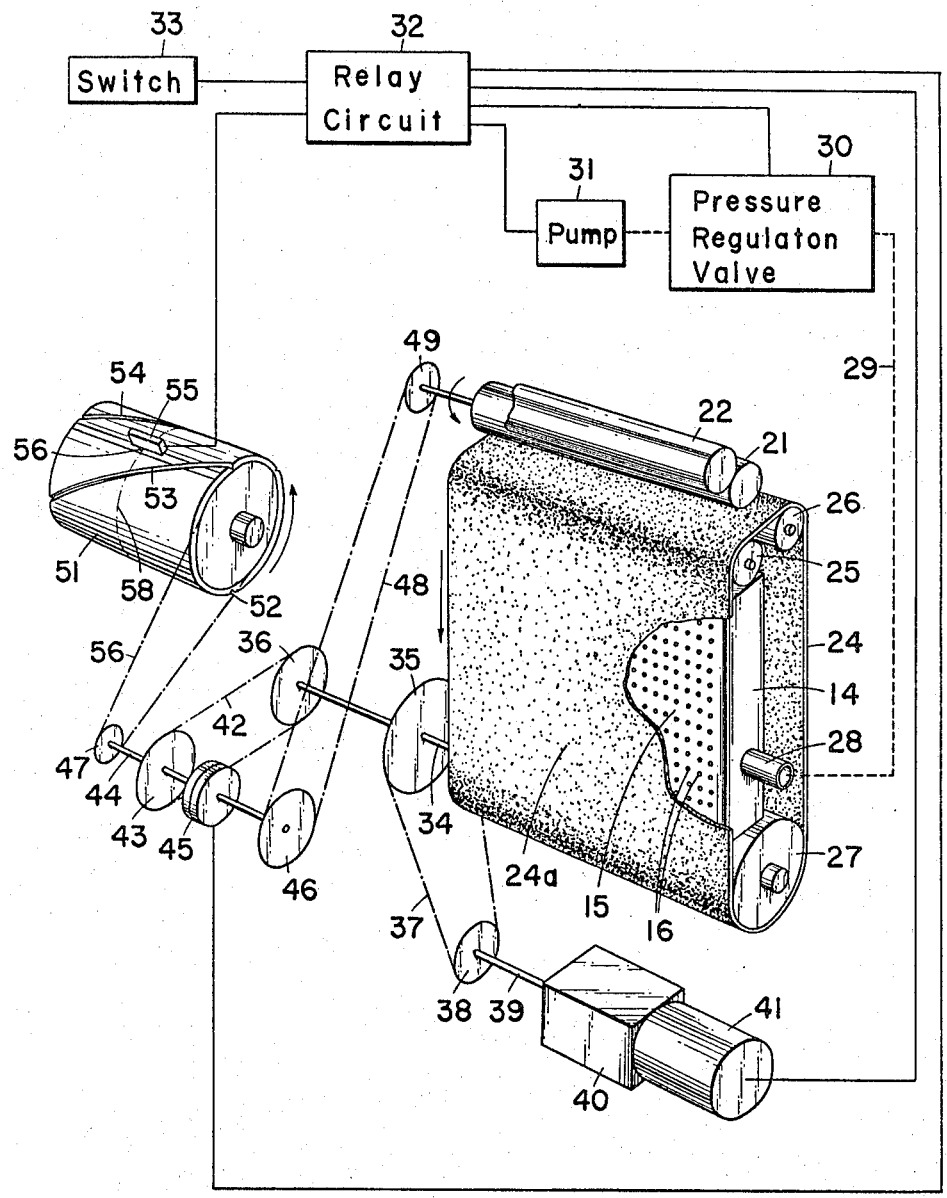
FIG. 2 illustrates partly in schematic perspective view and partly in block diagram the mechanism for driving a film feed roll and a film conveyor belt and means for controlling the driving mechanism employed in the embodiment of the invention shown in FIG. 1.

Referring to FIG. 2, the suction box 14 has a port 28 which is pneumatically connected via a conduit 29 and a pressure regulation valve 30 to a vacuum pump 31. The valve 30 and the pump 31 are electrically connected to a relay circuit 32 so that the operations of the valve and the pump are controlled by the relay circuit. The latter is electrically connected to a switch 33 adapted to control the electrical supply to the relay circuit 32. The switch 33 are mounted on a control panel (not shown) for the camera.

When the vacuum pump 31 is energized, vacuum is produced which is applied through the pressure regulation valve 30 and the conduit 29 to the suction box 14 which in turn is operative to suck air through the perforations in the front wall 15 of the box and in the front run 24a of the endless belt 24 to thereby suck a severed length of film F fed onto the front run 24a of the belt 24 by the cooperation of the feed roll 21 and the pressure roll 22.

The pressure regulation valve 30 is designed to be changed-over between two operative positions, i.e., between a "low pressure" position and a "high pressure" position. The expression "low pressure" is meant to say such a small amplitude of vacuum as to just enable the severed length of film F to be sucked against the front run 24a of the endless belt 24 and conveyed to the exposure position by the belt whereas the expression "high pressure" is intended to mean such a large amplitude of vacuum as to be sufficient to enable the conveyed length of film F to be surely held in a focussed position during the exposure thereof. Preferably, the "low pressure" may be on the order of from 100 to 150 mm $H_2O$ while "high pressure" may be on the order of 1,500 mm $H_2O$.

The drive roller 27 for the endless belt 24 is drivingly connected to a shaft 34 to which are secured pulleys 35 and 36 for rotation therewith. The pulley 35 is drivingly connected by an endless belt 37 to a pulley 38 on an output shaft 39 of a reduction bear box 40 drivingly connected to an electric motor 41 which in turn is electrically connected to the relay circuit 32 for the energization of the motor by the relay circuit.

The pulley 36 is drivingly connected by an endless belt 42 to a pulley 43 fixedly mounted on an intermediate shaft 44 having mounted thereon an electromagnetic clutch 45 and pulleys 46 and 47. The pulley 46 is drivingly connected by an endless belt 48 to a pulley 49 mounted on the film feed roll 21 for rotation therewith. The pulley 47 is drivingly connected by an endless belt 50 to a cam drum 51 to be described later in detail. The electromagnetic clutch 45 is electrically connected to the relay circuit 32 so that the clutch 45 is controlled in such a manner that the driving and driven parts of the clutch are disengaged from one another when a length of film has been severed off the roll film 18 by the cutter means 23.

The motor 41 is adapted to be energized when the initiation switch 33 is actuated, when the electromagnetic clutch 45 is disengaged and when the pressure valve 30 is changed-over to its "low pressure" position.

Figure 3:
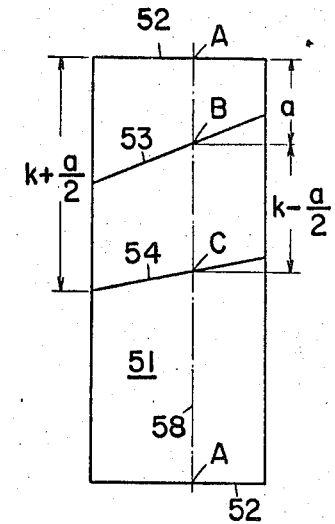
FIG. 3 illustrates a developed peripheral surface of a cam drum forming a part of the controlling means shown in FIG. 2.

As best shown in FIG. 3, the cam drum 51 has cam grooves 52, 53 and 54 formed in the peripheral outer surface of the drum 51. The cam groove 52 is parallel with the axis of the cam drum 51 while the cam grooves 53 and 54 spirally extend around the periphery of the cam drum 51 at angles, respectively.

A microswitch 55, which is electrically connected to the relay circuit 32 and has an actuator 56, is disposed in contact with the peripheral surface of the cam drum 51 so that the microswitch is actuated by the cam grooves 52, 53 and 54. The microswitch 55 is movable on the cam drum 51 axially thereof for the adjustment of the position of the microswitch with respect to the cam grooves and can be held stationary in any adjusted position along the length of the cam drum 51 for the predetermined operation of the microswitch as will be described in more detail later.

The operation of the camera according to the present invention will be presently described. When the camera is prepared for operation, the first cam groove 52 is positioned adjacent the microswitch 56. The positions of the supports for the lens system and the object, i.e., the original, to be photographed are so adjusted that the image of the object will be accurately focussed and projected on a length of film F held on the front run 24a of the endless belt 24. The dimension of the length of the film to be fed onto the front run 24a of the endless belt 24 will be determined so as to comply with the size of the projected image. The microswitch 55 is moved axially of the cam drum 51 to a position corresponding to the determined length of film to be fed. The initiation switch 33 will then be switched-on. The relay circuit 32 is made operative to energize the motor 41 and the vacuum pump 31, engage the driving and driven parts of the electromagnetic clutch 45 together and change-over the pressure regulation valve 30 to its "low pressure" position. The motor 41 rotates the pulley 34 which drives not only the perforated endless belt 24 in the direction indicated by the arrow in FIG. 2, but also the pulley 36 which in turn drives the film feed roll 21 and the cam drum 51 in the directions respectively indicated by arrows in FIG. 2. The feed roll 21 cooperates with the pressure roll 22 to draw the film 18 out of the cassette 19 and advance or feed the drawn film out of the magazine 17 through the outlet 20 therein onto the front run 24a of the perforated endless belt 24. When the film is reached by the suction zone, i.e., the perforated front wall 15 of the film suction box 14, the film is subjected to the suction by the suction box and is advanced or conveyed by the endless belt 24 while being sucked against the front run 24a thereof. When the cam drum 51 is rotated to a position in which the second cam groove 53 is reached by the microswitch 55 to actuate the latter, the motor 41 is deenergized while the cutter means 23 is energized to sever a length of film F from the film roll 18.

When the severing operation is completed, the driving and driven parts of the electromagnetic clutch 45 are disengaged from one another while the motor 41 is re-energized. It is, however, to be appreciated that the re-energization of the motor 41 does not result in the rotation of the film feed roll 21 since the electromagnetic clutch 45 is in its disengaged position at that time. The rotation of the motor 41 is therefore effective to drive the perforated endless conveyor belt 24 only so that the severed length of film F is conveyed by the front run 24a of the belt 24 until the third cam groove 54 is reached by the microswitch 55 for the actuation thereof to again deenergize the motor 41 as well as to change-over the pressure regulation valve 30 to its "high pressure" position whereby the severed length of film F is surely held in its exposure position by the large amplitude of vacuum fed to the suction box 14.

While the severed length of film F is held in this position, the object is illuminated and the shutter of the camera, not shown, will be opened to expose the length of film F to the illuminated object. The illumination and the exposure are wellknown in the art and will not be described in more detail.

When the exposure is completed, the pressure regulation valve 30 will be again changed-over to its "low pressure" position while the motor 41 is again energized to drive the perforated conveyor belt 24 so that the exposed length of film F is moved downward from the exposure position. When the exposed length of film F is moved out of the suction zone of the suction box 14, the film will be released from the front run 24a of the endless belt conveyor 24 and falls down into a container 57 disposed on the bottom of the camera housing 11. The rotation of the cam drum 51 will be continued until the first cam groove 52 is returned to its initial position to actuate the microswitch 55 so that the motor 41 is deenergized to finish a cycle of operation.

As described above, the cam drum 51 is intended to control the feed of the film 18 and the alignment of the fed length of film F with the optical axis of the lens system represented by a broken line X—X in FIG. 1. For this purpose, the profiles of the cam grooves in the peripheral surface of the cam drum 51 may be determined in a manner which will be discussed hereunder.

Figure 4:
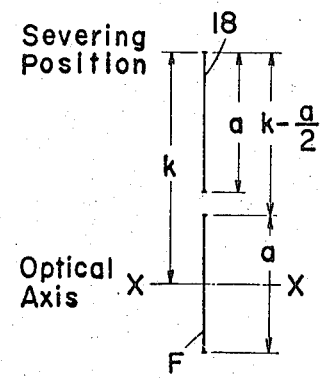
FIG. 4 diagrammatically illustrates the relationship between a severed length of film to be exposed and the distance over which the length of film is required to be conveyed to an exposure position in which the center of the length of film is aligned with the optical axis of the camera.

As will be seen in FIG. 4, in order that the center of a severed length of film F may be aligned with the optical axis X—X of the lens system of the camera, it will be appropriate that the severed length of film F be conveyed by the endless conveyor belt 24 a distance which is represented by:

$$K - a/2$$

wherein $K$ is the dimension between the position at which the film 18 is severed by the cutter means 23 and the optical axis X—X of the lens system and $a$ represents the length of the severed film F. Thus, the cam grooves 52, 53 and 54 in the peripheral surface of the cam drum 51 may be shaped as shown in FIG. 3. More specifically, the first cam groove 52 may be formed in the peripheral surface of the cam drum 51 so that the groove 52 is parallel with the axis of the cam drum 51. The cam groove 52 is adapted to be located adjacent the microswitch 55 in the initial stage of operation of the camera. Assuming that the microswitch 55 is positioned axially of the cam drum 51 so that the actuator 56 of the microswitch 55 scans the peripheral surface of the cam drum 51 along a path indicated by a broken line 58 in FIG. 3, the actuator 56 will be successively reached and passed by the cam grooves 52, 53 and 54 at points A, B and C along the path 58 as the cam drum 51 is rotated so that the actuator 56 is successively actuated by these cam grooves. The distance between the points A and B corresponds to the length $a$ of the film fed by the feed roll 21 while the distance between the points B and C corresponds to the dimension represented by $K - a/2$ over which the severed length of film F is to be conveyed. Thus, the locations of the second and third cam grooves 53 and 54 on the cam drum 51 may be determined on the basis of the size of the photograph required for the camera, the distance between the location of the cutter means 23 and the optical axis X—X of the lens system and the ratio of the speed of the perforated endless belt conveyor 24 with respect to the peripheral speed of the cam drum 51. The latter may be sized such that the entire peripheral dimension of the drum is large enough to enable the longest one of available lengths of film to be moved out of the suction zone of the suction box 14.

It will be apparent to those skilled in the art that the projections or ridges may be employed in place of the cam grooves which are utilized in the described and illustrated embodiment of the invention. The cam drum may be replaced by a rotary disc having cam means such as cam grooves or projections on a surface of the disc. Moreover, the perforated endless conveyor belt may be driven at a substantially predetermined fixed speed so that the cam means is replaced by a timer which is operative to control the movement or travel of the conveyor belt for the controlled feed and conveyance of a length of film to and from the exposure position thereof. Furthermore, manually operable electric switches may be employed in place of the automatically and sequentially operated control means above described and illustrated so that the successive steps of operation in a cycle may be manually controlled by means of the manually operable switches.

What is claimed is:

1. A photomechanical camera for use with a roll film, said camera comprising:
   a. a camera housing;
   b. means in said housing for drawing a part of the film from said roll and feeding the drawn film part toward an exposure position in which the center of said fed film part is aligned with the optical axis of said camera;
   c. a conveyor means including a belt member of a perforated material so arranged in said camera housing as to have a run substantially perpendicular to said optical axis, said run including said exposure position therein;
   d. means for driving said belt member to cause the same to be moved in said run in a direction extending from said drawing and feeding means to and past said exposure position, said driving means comprising an electric motor drivingly connected to said film drawing and feeding means and to said conveyor belt member;
   e. means for sucking air inwardly of the loop of said conveyor belt member through the perforations in said conveyor belt member, said sucking means being operative to exert vacuum force to said film part through the perforations in said conveyor belt member in said run for sucking said film part against said conveyor belt member in said run while said conveyor belt member is driven in said direction whereby said film part is conveyed by said conveyor belt member from said drawing and feeding means toward said exposure position;
   f. means disposed between said film drawing and feeding means and said sucking means for severing said drawn and fed film part from said roll film; and
   g. means for controlling the operation of said driving means so that said conveyor belt member is stopped just at a time when said film part is moved to said exposure position, whereby said film part is retained in said exposure position by said vacuum force during exposure of said film part, said controlling means including:
      i. a first means for maintaining said electric motor in its inoperative position;
      ii. an initiation switch for energizing said motor;
      iii. a second means for interrupting the operation of said motor and causing said film severing means to operate when a desired length of film is fed onto said conveyor belt member;
      iv. means automatically operative to again energize said motor when the operation of said film severing means is finished; and
      v. a third means for again interrupting the operation of said motor when said severed length of film is reached by said exposure position and for causing said sucking means to positively hold said length of film on said conveyor belt member in said exposure position.

2. A camera as defined in claim 1, in which said first, second and third means are cams, respectively, said cams being provided on a member driven by said motor.

3. A camera as defined in claim 2, in which the distance between said first and second cams corresponds to the dimension of the length of film fed onto said conveyor belt member and the distance between said second and third cams corresponds to the distance between said optical axis and said film severing means minus one half the dimension of said length of film fed onto said conveyor belt member.

4. A camera as defined in claim 2, in which said member driven by said motor is a cam drum having a peripheral surface formed therein with cam grooves.

5. A camera as defined in claim 1, in which said first, second and third means are formed by a timer.

6. A photomechanical camera for use with a roll film, said camera comprising:
   a. a camera housing;
   b. means in said housing for drawing a part of the film from said roll and feeding the drawn film part toward an exposure position in which the center of said fed film part is aligned with the optical axis of said camera;
   c. a conveyor means including a belt member of a perforated material so arranged in said camera housing as to have a run substantially perpendicular to said optical axis, said run including said exposure position therein;
   d. means for driving said belt member to cause the same to be moved in said run in a direction extending from said drawing and feeding means to and past said exposure position;
   e. means for sucking air inwardly of the loop of said conveyor belt member through the perforations in said conveyor belt member, said sucking means being operative to exert vacuum force to said film part through the perforations in said conveyor belt member in said run for sucking said film part against said conveyor belt member in said run while said conveyor belt member is driven in said direction whereby said film part is conveyed by said conveyor belt member from said drawing and feeding means toward said exposure position, said sucking means comprising a suction box, an electrically powered vacuum pump, and a conduit pneumatically connecting said pump with said suction box;

f. means for controlling the operation of said driving means so that said conveyor belt member is stopped just at a time when said film part is moved to said exposure position and whereby said film part is retained in said exposure position by said vacuum force during exposure of said film part; and g. means for controlling the supply of vacuum to said suction box comprising an electrically responsive pressure regulation valve disposed in said circuit and a switching circuit electrically connected to said valve, said valve having first and second regulating positions, said first position causing a relatively low amplitude of vacuum to reach said suction box, and said second position causing a relatively high vacuum to reach said suction box, said switching circuit being adapted to switch said valve to said first regulating position when said film part is being conveyed toward said exposure position and to said second regulating position when said film part is in said exposure position during its exposure.

7. A camera as defined in claim 6, in which said pressure regulating valve, in said first regulating position, causes a vacuum to reach said suction box which is sufficient to suck said film part against said conveyor belt member while said belt is in motion, and which, in said second regulating position, causes a vacuum to reach said suction box which securely holds said film against said conveyor belt while said belt is stationary.

8. A camera as defined in claim 6, in which said suction box has a substantially flat perforated wall portion extending in substantially parallel and close contacting relationship with said run of said belt member, the arrangement being such that at least one of the perforations in said flat wall portion of said suction box is in registration with a perforation in said conveyor belt member in an area covered by said film part.

9. A camera as defined in claim 6, in which said film drawing and feeding means comprises a film feed roll drivingly connected to said driving means and a pressure roll in rolling contact with said feed roll, said conveyor means further including a drive roll disposed adjacent one of the top and bottom ends of said suction box and at least one guide roll disposed adjacent the other end of said suction box, said conveyor belt member extending around said drive and guide rolls, said drive roll being drivingly connected to said driving means.

10. A camera as defined in claim 6, further comprising means disposed between said film drawing and feeding means and said sucking means for severing said drawn and fed film part from said roll film.

* * * * *